Patented Jan. 13, 1931

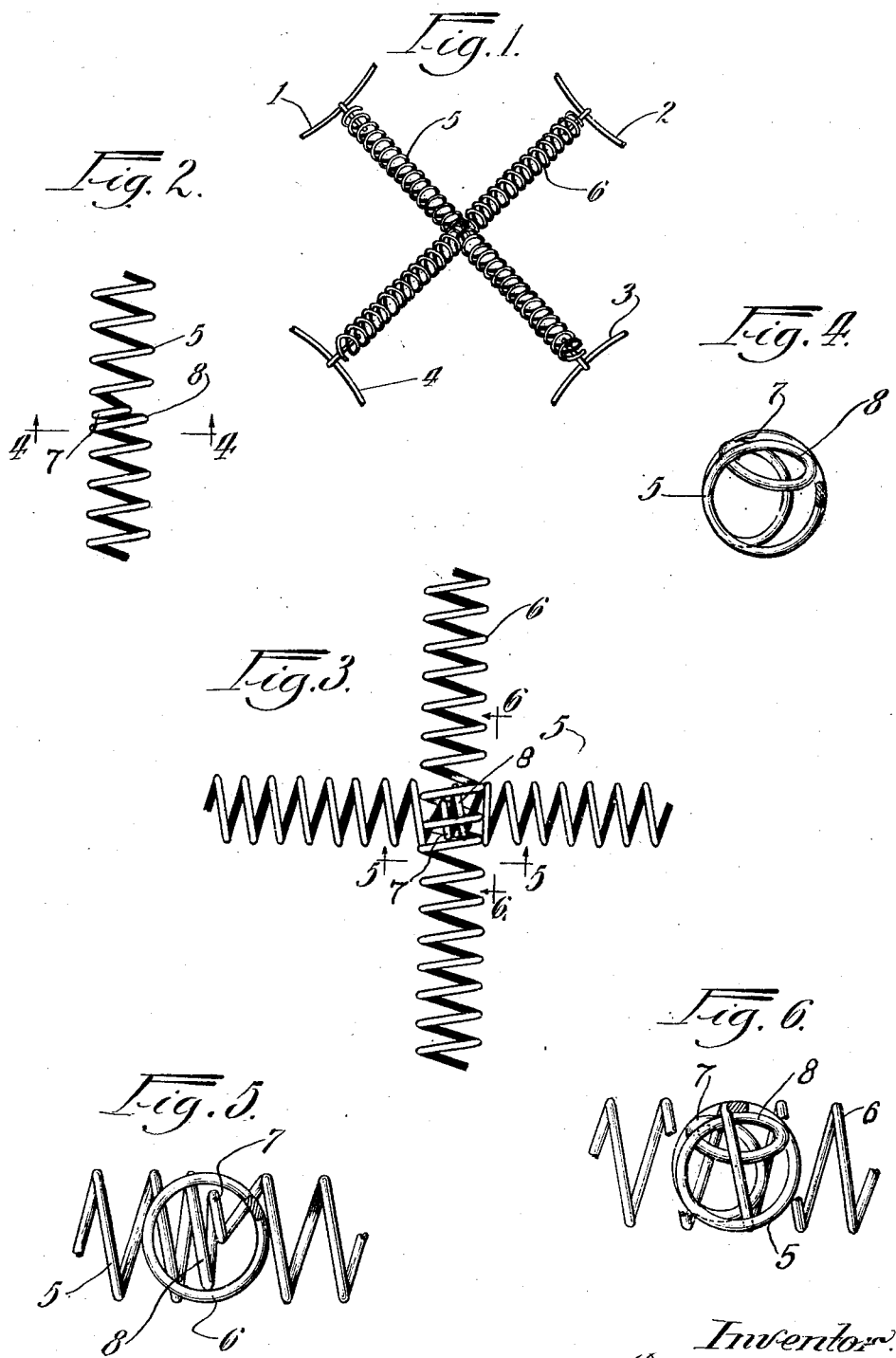

1,788,868

UNITED STATES PATENT OFFICE

DARWIN HANAUER, OF LA GRANGE, ILLINOIS, ASSIGNOR TO ROME COMPANY, INC., A CORPORATION OF NEW YORK

HELICAL SPRINGS CROSSED AND INTERLOCKED

Application filed May 12, 1927. Serial No. 190,957.

The upper rings of the spiral springs in spring cushions, such as bed springs, are commonly tied together by means of small helical springs; the two helical springs in the space between a group of four adjacent spiral springs crossing each other and being screwed one into the other. In the use of these cushions, as the main springs become compressed and again expand, the crossed coil springs are permitted to play relatively to each other out of the plane that normally contains their long axes. The result is that these tie springs slip on each other, producing squeaky noises and scraping off the paint with which they are decorated.

In my prior application Serial Number 171,059, I have disclosed means for overcoming this objection through the locking of the crossed springs against relative displacement of their long axes out of the plane normally containing them. In one of its aspects the present invention may be said to have for its object an improved modification of the broad idea disclosed in my aforesaid application.

In the aforesaid application, the interlock is affected by screwing one spring through the other, this screwing operation requiring an appreciable amount of time for its performance. Viewed in one of its aspects, the present invention may be said to have for its object to provide means for effectively interconnecting two coiled springs, so that they will be held against displacement of their long axes out of the plane normally containing them, by the mere act of snapping the two springs together, thus avoiding the necessity of the tedious screwing operation.

In accordance with my invention, I deform an intermediate turn of one of the springs by bending the wire sharply in the same direction as the normal curvature and at two points spaced apart a distance considerably less than one hundred eighty degrees, to form two eyes or loops that may be caused to position themselves within the bore of the crossing spring by simply laying an intermediate turn of the crossing spring approximately parallel and adjacent to these loops or eyes, pressing the two springs together to bring their long axes into the same plane, and then swinging the springs relatively to each other until they lie at right angles to each other.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a plan view of a fragment of a spring cushion, showing parts of four coils or rings tied together by two interlocked crossed helical springs; Fig. 2 is an elevation on an enlarged scale, of the middle portion of the deformed spring; Fig. 3 is a plan view of the two interlocked tie springs, on the same scale as Fig. 2; Fig. 4 is a section on a still larger scale, taken approximately on line 4—4 of Fig. 2; and Figs. 5 and 6 are sections, on the same scale as Fig. 4, taken respectively on line 5—5 and line 6—6 of Fig. 3.

Referring to the drawing, 1, 2, 3 and 4 represent fragments of the upper rings or coils of four spiral springs that may be said to constitute a group in a spring cushion. 5 and 6 are two crossed helical springs of comparatively small diameter secured at their ends to the four main springs in any preferred way. The spring 6 is simply a plain spring. The middle turn of the spring 5 is, however, bent sharply in the same direction as the general curvature of the wire at two points separated from each other an angular distance of considerably less than one hundred eighty degrees, to produce two loops or eyes 7 and 8 as best shown in Fig. 4. These loops or eyes may be said to lie side by side on opposite sides of the longitudinal center of the spring. When the spring 6 is applied it is laid with an intermediate turn approximately parallel with and adjacent to the eyes or loops 7 and 8, and it is then pressed down and simultaneously swung to bring it at right angles to the spring 5 with the result, as best shown in Fig. 3, that the loops or eyes 7 and 8 locate themselves within the bore of the spring 6 while the two adjacent turns of the spring 5 spread apart far enough to receive the spring 6 between them.

When the two springs are assembled, one upon the other, they will be securely interlocked against relative displacement out of a plane containing them during the yielding of the spring cushion of which they form a part, thus preventing the noises and the marring of the paint on the small springs, heretofore incident to the use of these tie springs.

While I have illustrated and described with particularity only a single preferred form of my invention, I do not desire to be limited to the exact structural details thus illustrated and described; but intend to cover all forms and arrangements which come within the definition of my invention constituting the appended claims.

I claim:

1. Two crossed helical springs, an intermediate turn of one of the springs being bent sharply at points less than one hundred eighty degrees apart to form loops or eyes arranged parallel with the normal plane of the turn, the other spring being sprung into place over and surrounding these loops or eyes.

2. A coiled spring one of whose turns is bent sharply in the some direction at two points less than one hundred eighty degrees apart to form loops or eyes.

3. Two crossed helical springs, one of the springs being of normal contour, and one of the turns of the second spring being deformed to produce two oppositely directed loops lying within the first spring and on the same side of a plane containing the long axes of the springs.

In testimony whereof, I sign this specification.

DARWIN HANAUER.